Figure 1:
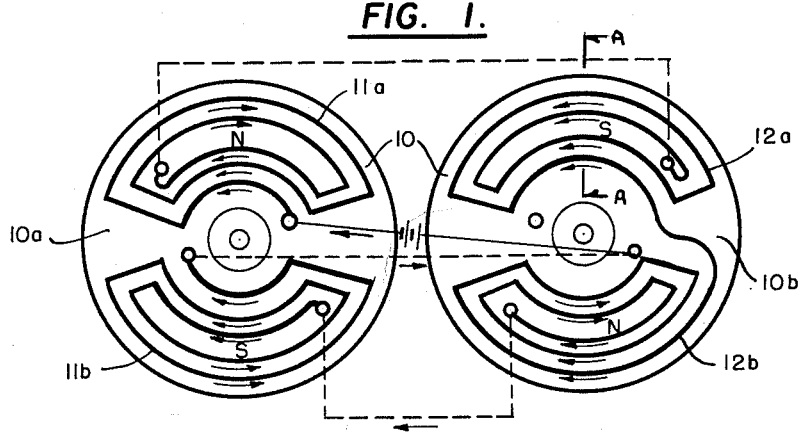

May 12, 1964     L. W. PARKER     3,133,249

PRINTED CIRCUIT METER ROTORS

Filed July 31, 1961

INVENTOR

Louis W. Parker

BY *Moore & Hall*

ATTORNEYS

United States Patent Office 3,133,249
Patented May 12, 1964

3,133,249
PRINTED CIRCUIT METER ROTORS
Louis W. Parker, 375 Fairfield Ave., Stamford, Conn.
Filed July 31, 1961, Ser. No. 128,018
5 Claims. (Cl. 324—150)

The present invention relates to improved meter structures of the types employing a rotor comprising a printed circuit coil; and is more particularly concerned with an improved rotor structure adapted for use in such meter applications and operative when so utilized to produce a meter having higher sensitivity than has been possible heretofore. The instant application comprises a continuation-in-part of my prior copending application Serial No. 824,729, filed July 2, 1959, for: "Printed Circuit Meter Rotors," now abandoned.

In my prior patent, No. 2,773,239, issued December 4, 1956, for: "Electrical Indicating Instruments," I have described and claimed an improved meter employing a rotor of printed circuit construction. The meter itself comprises pole pieces having a rotor mounted therebetween; and the rotor takes the form of a thin disc having conductive deposits of coil configuration supported on the opposed sides thereof. The preferred form of rotor shown in my said prior patent comprises a disc of conductive material, preferably aluminum; and the coils comprise conductive copper deposits disposed in coil configuration on opposed sides of said aluminum disc and insulated from the aluminum disc by thin layers of aluminum oxide formed by anodizing the aluminum disc prior to the application of coil deposits thereto. By this structure, the conductive coil deposits may perform the conventional function of providing a field in response to an input, which field is adapted to move the rotor between the aforementioned pole pieces thereby to give a metering indication. The aluminum oxide mentioned acts to insulate the coil deposits from the conductive or aluminum disc rotor; and the aluminum in the base or disc of the rotor acts to damp rotor movement.

The forms of rotors described in my said prior patent normally utilize an aluminum disc having a thickness in the order of 0.01 inch, in order to effect a structure of sufficient mechanical strength; and the aluminum oxide layer mentioned is an extremely thin layer having a thickness comprising only a small fraction of the aluminum disc thickness (i.e. in the order of 0.0003 inch), affording no mechanical strength per se, and functioning merely as an insulating layer between the aluminum disc and the conductive coil deposit thereon.

It has been found that the relatively thick aluminum disc normally required to provide necessary mechanical strength, while entirely practical in certain meters, provides too much damping when the meter being constructed is to read full-scale for relatively small current inputs. Thus, as the desired sensitivity of the instrument increases, a progressively thinner aluminum base must be employed to prevent over-damping; but as the thickness of the aluminum disc is decreased in such higher sensitivity instruments, the mechanical strength of the rotor similarly decreases, with a point being soon reached wherein a mere reduction in thickness of the aluminum disc becomes impractical in the production of a high sensitivity instrument, due to the accompanying decrease in mechanical strength of the disc itself.

By way of example, I have found that a one milliampere full-scale instrument constructed in accordance with the teachings of my prior Patent No. 2,773,239, requires an aluminum base member of essentially foil configuration, having a thickness of between 0.001 and 0.0005 inch. If thicker foil is employed, over-damping results and, in addition, the increase weight of such thicker foil tends to lower the torque-to-weight ratio of the rotor.

The present invention, recognizing these difficulties of a simple reduction in thickness of the meter rotor, is accordingly concerned with a novel form of construction adapted for use in meter rotors and operative to provide the necessary damping, without over-damping, in a high sensitivity printed circuit meter, with a structure still having sufficient mechanical strength to make the utilization of such a rotor practical.

It will be understood that the structures to be described hereinafter, while described in reference to their use in printed circuit meters, may have somewhat more generalized application when it is desired to produce an extremely thin but nevertheless strong base structure for use in printed circuit applications; and accordingly the techniques and structures to be described hereinafter have certain general utility. It will further be understood, however, that the prime utility of the structures to be described hereinafter is in the provision of a meter rotor. Such a rotor must necessarily be associated with appropriate mounting devices, indicators, magnets, etc., all of which will not be specifically described herein. Insofar as such structure is necessary to a complete understanding of the invention, however, the disclosure in my prior patent, No. 2,773,239 is incorporated thereby reference; and it will be understood that the improved rotor or printed circuit structures to be described hereinafter can be employed in place of the rotor units in the several figures of that patent.

It is accordingly an object of the present invention to provide an improved printed circuit structure.

A further object of the present invention resides in the provision of a supporting member for printed circuits, having small thickness but appreciable mechanical strength.

A still further object of the present invention resides in the provision of an improved printed circuit meter rotor comprising an extremely thin layer of aluminum or other conductive material adapted to damp without over-damping the rotor in a high sensitivity instrument, and associated with improved bracing structures giving the overall rotor appreciable mechanical strength without unduly increasing the weight or dimensions of the overall rotor.

A further object of the present invention resides in improved methods of fabricating a high sensitivity meter as well as particular portions thereof.

Still another object of the present invention resides in the provision of a high sensitivity meter employing a printed circuit rotor of novel construction.

In providing for the foregoing objects and advantages, the present invention contemplates the production of a printed circuit base structure, and particularly of a printed circuit meter rotor comprising an extremely thin layer of aluminum having little inherent mechanical strength. This thin aluminum layer is disposed between a pair of laminations of stiffening material which can comprise in one embodiment of the present invention layers of thin mica. In a preferred embodiment of the present invention, however, the stiffening layers mentioned comprise relatively thick layers of aluminum oxide, preferably a hydroxide of aluminum; and these stiffening layers are in turn associated with and support further layers of conductive copper forming the coil configurations mentioned previously, associated if desired with still further layers of an adhesive material, e.g. epoxy cement. The overall structure is relatively thin, and of low weight; has considerable mechanical strength; incorporates a layer of aluminum sufficient to provide necessary damping, without over-damping, in a high sensitivity instrument; and is adapted to be fabricated by mass production techniques simply and relatively inexpensively.

The foregoing objects, advantages, construction and operation of the present invention will become more readily apparent from the following description and accompanying drawings, in which:

FIGURE 1 is a generalized representation of a printed circuit meter rotor of the types described in my prior patent, No. 2,773,239 as well as of the types which may be employed in the present invention.

Figure 2:
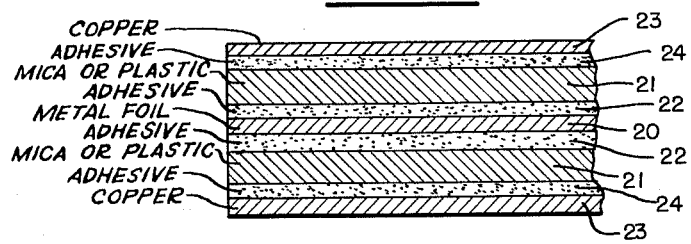
Figure 3:
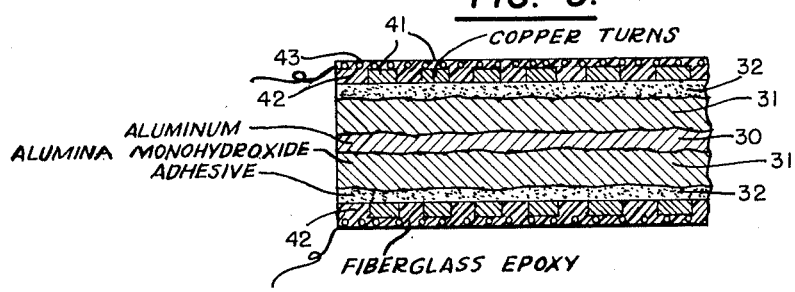

FIGURE 2 is a cross-sectional view, highly enlarged, of one form of printed circuit rotor structure which may be employed in the production of a high sensitivity meter instrument; and FIGURE 3 is a cross-sectional view, taken on line A—A of FIGURE 1 and highly enlarged, of a preferred form of printed circuit meter rotor structure such as may be employed in the production of a high sensitivity meter.

Referring now to FIGURE 1, it will be seen that a printed circuit meter rotor, of the type shown in my prior patent, No. 2,773,239, and adapted to be employed in conjunction with and mounted between appropriate magnetic pole pieces, may comprise a disc 10 having opposed sides 10a and 10b. The disc itself is preferably constructed of aluminum and has, in the form described in my prior patent, an extremely thin layer of aluminum oxide on the opposed surfaces thereof serving to insulate the aluminum disc from copper deposits of coil configuration designated in FIGURE 1 as coil sections 11a, 11b and 12a, 12b. Reference is made to my prior patent, No. 2,773,239 for a full discussion of the manner in which the several coil sections 11a, 11b and 12a, 12b are interconnected to one another as well as for a discussion of how these coils cooperate with one another and with associated field magnets in the operation of the overall meter.

The structure shown in FIGURE 1 depicts the configuration of a meter rotor which may be produced in accordance with the present invention, i.e. employing the composite structures of FIGURE 2 or 3 to be described hereinafter. Thus, the rotor employing the structures to be subsequently described comprises a disc or other relatively thin supporting structure having conductive coil deposits on opposed faces thereof insulated from an essentially conductive base member by layers of insulating material.

The rotor configuration shown in FIGURE 1 would normally comprise a relatively thick aluminum layer, as discussed in my prior patent; and this thick layer while normally considered necessary to effect desired mechanical strength, provides entirely too much damping when utilized in a high sensitivity (e.g. one milliampere full-scale deflection) meter instrument. For such a high sensitivity instrument, the thickness of the aluminum layer should be in the order of 0.001 to 0.0005 inch; but an aluminum foil layer of this thinness is entirely too weak, of itself, to constitute a practical rotor construction.

FIGURE 2 illustrates one form of rotor structure which may be provided to increase the mechanical strength of the overall rotor unit without increasing the amount of aluminum in the unit. Thus, it will be noted that, in cross-section, this first form of the invention may comprise a thin aluminum foil layer 20 having a thickness in the order of 0.0005 inch. This foil layer 20 may or may not be anodized; and the foil layer 20 is braced and otherwise strengthened by thin sheets of mica or plastic 21 cemented or otherwise secured to opposed sides of the foil layer 20 by adhesive layers 22. As a practical matter, in order to provide a rotor structure having a weight consistent with the requirement of a high sensitivity instrument, the mica or plastic layers 21 should have a thickness in the order of 0.001 inch, and similarly, the adhesive layers 22 should have a thickness in the order of 0.001 inch. The laminated structure comprising aluminum layer 20 and the adhesively secured bracing layers 21, may then be bounded by copper layers 23 adhesively secured to the outer surfaces of the plastic layers 21 by further adhesive layers 24; and the copper layers 23 are, of course, utilized to ultimately produce copper deposits of coil congfigurations such as those designated 11a, 11b and 12a, 12b in FIGURE 1. One or both of adhesive layers 22 and 24 preferably comprise a material such as epoxy cement which, in conjunction with the other layers, adds to the rigidity of the laminated structure and of a rotor formed therefrom.

It will be understood that the copper layers 23 may be treated, e.g. by an etching technique, to produce the conductive coil deposits on the opposed sides of the overall structure shown in FIGURE 2. Briefly, the thin laminations of copper 23 may be coated with a light-sensitive material; and an image of a coil may then be photographed onto the light-sensitive surfaces and developed in conventional manner. After developing, the light-sensitive material is washed away from unexposed sections, leaving a "resist" comprising the remaining material which had been exposed to light. The copper surfaces may then be washed with acid to etch all portions of the copper layers 23 except those covered by the aforementioned resist, thereby ultimately producing coil configurations of the types depicted in FIGURE 1.

While the structure thus described in reference to FIGURE 2 produces an excellent rotor, it must be manufactured in relatively small quantity production inasmuch as mica of the desired thickness is available in small sheets only. Mass production techniques require that a large number of rotors, of the types illustrated in FIGURE 1, be etched simultaneously from a comparatively large sheet of laminated material. While plastic materials of sufficient thinness in large sheets (used in place of the mica layers described) are available, most of them are not sufficiently stiff in a sheet 0.001 inch thick to give a rotor construction of desired mechanical strength; and accordingly if commercially available plastics are utilized in place of the mica layers mentioned, a somewhat weaker structure results.

Another rotor structure, more adaptable to mass production techniques is shown in FIGURE 3. In particular, a sheet of aluminum 30 is oxidized to provide relatively thick oxide films 31 on opposed sides thereof. In the arrangement described in my prior Patent No. 2,773,239, the aluminum layer was, as mentioned, in the order of 0.01 inch thick, and had oxide films on opposed sides thereof having a thickness in the order of 0.0003 inch. Thus, the oxide film produced in accordance with my prior patent has a thickness which is only a small fraction of the thickness of the aluminum itself, whereby the aluminum disc provides substantially the entire mechanical strength of the entire unit with the oxide film contributing substantially no stiffness to the structure.

The arrangement shown in FIGURE 3 materially differs from this prior arrangement in that the aluminum layer is so thin that it affords substantially no mechanical strength to the overall disc, while the oxide layers are of such appreciable thickness as to impart the desired disc bracing and strengthening function mentioned. In particular, a sheet of aluminum foil is first heavily oxidized to provide relatively thick layers of oxide on the opposed sides thereof. This heavy oxidation uses up much of the aluminum originally present. For example, in a preferred technique a sheet of aluminum foil having an original thickness in the order of 0.002 inch is oxidized to the point where about two-thirds of the aluminum therein is used up in forming the oxide. After oxidation by electrolysis, the sheet is sealed, usually by placing it in hot water or in a hot metal salt solution whereby water is absorbed in the oxide layers, converting the same to alumina monohydroxide. The overall thickness of sheet comprising the layers 30 and 31 shown in FIGURE 3 is accordingly increased from its original thickness of 0.002 inch to about 0.0027 inch. The actual aluminum comprising layer 30 is reduced to a thickness of about 0.0007 inch; and the alumina monohydroxide layers 31 disposed on opposed sides of this thin and relatively weak sheet of aluminum have a thickness in the order of 0.001 inch each.

The 0.001 inch oxide layers have been found to brace the overall structure to the point where it has a mechanical strength substantially equal to the arrangement described in FIGURE 2 utilizing mica layers of similar thickness; but at the same time the weight of the unit shown in FIGURE 3 is reduced below that of the unit shown in FIGURE 2, thereby increasing the torque-to-weight ratio of the rotor and enhancing the sensitivity of the instrument. It has also been found that the rigidity of a disc constructed in accordance with the arrangement shown in FIGURE 3 is greatly increased by the fact that the surface areas of the aluminum layer 30 as well as of the alumina monohydroxide layers 31 are relatively rough. When bending forces are applied to the disc, the monohydroxide layers 31 tend to slide over the facing surfaces of the aluminum layer 30, and the rough texture of these abutting surfaces tend to stiffen the overall structure by resisting such sliding between layers. Indeed, as will become apparent from the subsequent description, the structure of FIGURE 3 is associated with laminations of copper forming the copper coils mentioned previously; and during the laminating process, the copper layer and/or adhesive layers employed therewith may be pressed into the pitted or roughened surfaces of the alumina monohydroxide layers 31 thereby increasing the strength of the overall unit against deformation even further.

While the aluminum layer 30 shown in FIGURE 3 may be as much as 0.001 inch in thickness, this thickness has still been found to produce proper magnetic damping in a relatively sensitive meter, i.e. one milliampere full-scale. A solid aluminum unit having this thickness might well produce too much damping, but the rough surface of the heavily oxidized aluminum tends to decrease the damping properties of the structure to a proper value. As a result of all these considerations, therefore, the overall structure shown in FIGURE 3 comprises a relatively thin layer of aluminum, consistent with proper damping in a high sensitivity instrument; and includes appreciably thicker layers of anodizing than has been suggested heretofore to strengthen the overall disc without unduly increasing the dimensions or weight of the unit. The entire unit may be produced in large sheets by an efficient anodizing technique, thereby eliminating the piecing operations necessarily employed when a laminated structure of the type shown in FIGURE 2 is fabricated, and permitting use of the mass production techniques in the formation of plural rotors.

It will be appreciated that the aluminum layer 30 and oxide layers 31 are designed to act as a relatively stiff base member for printed circuits, e.g. of the coil configuration shown in FIGURE 1. In producing this type of structure, the outer surfaces of the oxide layers 31 may be coated with layers of adhesive 32, and thereafter with copper foil layers, whereafter an etching technique of the type previously described can be employed to produce conductive coils, the turns of which are shown in section at 41. If desired, however, the layer of anodizing 31 can be built up to an even greater thickness than that previously described, and this may be further strengthened by an adhesive layer, and an alternative process of forming the coil can then be employed. In this latter process, rather than employing copper sheets to be etched, a layer of light-sensitive material is first placed directly upon the relatively thick layers of aluminum oxide compound or adhesive layer whereafter a coil may be photographed onto this layer of light-sensitive material. After developing and washing the resultant layer, a resist made up of exposed light-sensitive material, will remain directly upon the anodized or adhesive layer. A suitable conductive metal, such as silver, copper, or aluminum may then be vacuum deposited over the entire surface by well known "sputtering" methods, in which the metal is vaporized in a vacuum and condensed on the surface. After the metal is so deposited, the photoresist may be washed off (together with any metal deposited over this resist), thereby exposing clear spaces between the adjacent turns 41 of the coil and leaving a coil pattern of condensed metal supported directly by the oxide or adhesive layer. The thickness of this remaining metal may indeed be increased by depositing even more metal over it by conventional electroplating processes.

Wherever the anodizing process is mentioned in the foregoing it is meant as a process making use of the aluminum base material from which is formed a chemical compound with additional materials to cover that base surface. There are a number of such processes in use, most of which are applicable to the invention. It will be appreciated, moreover, that the foregoing technique is merely illustrative, and that other techniques will be readily suggested to those skilled in the art for fabricating a coil upon the composite base members described. The essential consideration, however, is that the actual base member comprise a relatively thin layer of conductive material such as aluminum associated with appreciable stiffening layers formed out of the aluminum base by combining that base with oxygen and/or with other chemicals.

The laminated and rotor structures thus far described in reference to FIGURES 2 and 3 are characterized essentially by the use of heavily anodized aluminum wherein the rigidity of the rotor is materially increased by the described heavy layers of alumina monohydroxide adhering to the aluminum layer, and wherein, in addition, layers of epoxy cement and etched copper coils are also provided each of which layers add to the rigidity of the rotor. The embodiment of FIGURE 3, comprising a preferred form of the present invention, includes certain additional structural features, however.

In particular, I have found that, in many instances, it is desirable to further increase the rigidity of the rotor. It is also desirable to seal the etched copper coils from air and moisture to prevent oxidation as well as the formation of possible other chemical compounds. For this reason, layers 42 of epoxy or plastic material, which may or may not contain some fiberglass, are added to the outside of the disc. It is important that the plastic material 42, which may be epoxy, be made to flow between the etched copper turns 41. In this way there is a substantial increase in the rigidity of the disc over the condition where there is nothing between the turns, and wherein the disc could bend over the empty spaces thus present. I have found that a 0.001 inch thick fiberglass epoxy sheet in thermoplastic condition can be laminated to the copper under suitably high temperature and pressure and is, during the laminating step, made to flow into the spaces between turns 41. The glass fibers 43 help somewhat to further increase rigidity; however, this is not absolutely necessary.

One great advantage of laminating after etching is that the process flattens out the sheet, which is otherwise somewhat uneven due to etching and handling and often has creases and wrinkles. A single such sheet, utilized for mass production of rotors having the cross-sectional configuration shown in FIGURE 3, usually contains sixteen discs. After laminating the structure with fiberglass epoxy sheet, the individual discs are punched out, and they remain more rigid than a large sheet.

Having thus described my invention, I claim:

1. A measuring instrument having a laminated rotor structure comprising a layer of thin aluminum foil having little inherent mechanical strength, said rotor structure further comprising a strengthening and insulating layer comprising an oxide of aluminum adhering to said aluminum foil layer, said oxide layer having a thickness in the same order of magnitude as the thickness of said aluminum foil, the facing surfaces of said aluminum foil and oxide layers being roughened to inhibit sliding of said oxide layer relative to said aluminum foil layer upon application of bending forces to said laminated structure, a conductive circuit deposit of coil configuration disposed adjacent the outermost surface of said oxide layer, and a layer of strengthening plastic material in intimate contact with said conductive circuit deposit, said strengthening layer having a thickness in the same order of magnitude as the thickness of said aluminum foil.

2. The combination of claim 1 wherein said conductive circuit deposit includes spaced conductive portions, said layer of plastic material comprising epoxy sheet material laminated over the outermost side of said circuit deposit and including portions in intimate contact with said spaced conductive portions and filling the space therebetween.

3. A laminated printed circuit meter rotor comprising a layer of non-magnetic metal foil having a thickness of substantially 0.0005 to 0.001 inch, a first pair of strengthening laminations bonded to the opposed sides of said metal foil layer, each of said strengthening laminations comprising an insulating material having a thickness in the order of 0.001 inch, conductive deposits of coil configuration supported on the outer faces of said strengthening laminations in electrically insulated relation to said layer of metal foil, and a second pair of strengthening laminations bonded to the outermost surfaces of said conductive deposits and including portions penetrating between adjacent turns of said coil configuration deposits.

4. A laminated printed circuit meter rotor comprising a thin inherently weak substantially continuous layer of conductive non-magnetic metal foil, at least one surface of said foil layer being chemically altered to form a strengthening layer of non-conductive material thereon having a thickness at least equal to that of said metal foil layer, a layer of adhesive material on said non-conductive strengthening layer, a further conductive layer supported by said adhesive material on said non-conductive strengthening layer in insulated relation to said layer of conductive metal foil, said further conductive layer having portions thereof spaced from one another whereby said further layer exhibits a printed circuit configuration, and an outermost protective and strengthening layer of plastic material covering said further conductive layer and including portions penetrating between the spaced portions of said further conductive layer into contact with said adhesive layer.

5. A laminated printed circuit meter rotor comprising a thin layer of aluminum foil having a thickness not in excess of 0.001 inch and resultant little mechanical strength, a layer of alumina monohydroxide adhering to both sides of said aluminum foil layer, each of said monohydroxide layers having a thickness in the same order of magnitude as the thickness of said aluminum foil whereby said monohydroxide layers stiffen and impart mechanical strength to said foil layer, layers of adhesive material on the outer surfaces of said monohydroxide layers, layers of copper carried by said adhesive layers in insulated relation to said layer of aluminum foil and having portions of said copper spaced from one another to define a circuit configuration, and layers of fiberglass reinforced epoxy sheet material laminated over the outermost surfaces of said copper circuit configuration with portions of said epoxy sheet material penetrating into the spaces between said spaced copper portions.

References Cited in the file of this patent
UNITED STATES PATENTS

| | | |
|---|---|---|
| 2,088,349 | Fekete | Aug. 3, 1937 |
| 2,773,239 | Parker | Dec. 4, 1956 |
| 2,955,974 | Allen | Oct. 11, 1960 |

FOREIGN PATENTS

| | | |
|---|---|---|
| 287,503 | Great Britain | Feb. 14, 1929 |
| 390,346 | Great Britain | Apr. 6, 1933 |
| 753,875 | Great Britain | Aug. 1, 1956 |